United States Patent
Cocchi et al.

(10) Patent No.: US 9,016,926 B2
(45) Date of Patent: Apr. 28, 2015

(54) MACHINE FOR THE HOMOGENIZATION AND THERMAL TREATMENT OF LIQUID AND SEMI-LIQUID FOOD PRODUCTS

(75) Inventors: Andrea Cocchi, Calderara di Reno (IT); Roberto Lazzarini, Reggio Emilia (IT)

(73) Assignee: ALI S.p.A.—Carpigiani Group (IT)

( * ) Notice: Subject to any disclaimer, the term of this patent is extended or adjusted under 35 U.S.C. 154(b) by 852 days.

(21) Appl. No.: 13/269,941

(22) Filed: Oct. 10, 2011

(65) Prior Publication Data

US 2012/0103201 A1 May 3, 2012

(30) Foreign Application Priority Data

Oct. 28, 2010 (IT) .............................. BO2010A0647

(51) Int. Cl.
| | | |
|---|---|---|
| A23G 9/12 | (2006.01) | |
| A23G 1/10 | (2006.01) | |
| A23G 3/02 | (2006.01) | |
| A23G 1/18 | (2006.01) | |
| F25B 9/00 | (2006.01) | |
| F25B 13/00 | (2006.01) | |

(52) U.S. Cl.
CPC ............... *A23G 3/0226* (2013.01); *A23G 1/18* (2013.01); *F25B 9/008* (2013.01); *F25B 13/00* (2013.01); *F25B 2309/061* (2013.01)

(58) Field of Classification Search
CPC ........ A23G 1/18; A23G 3/0226; F25B 13/00; F25B 2309/061; F25B 9/008
USPC ......... 366/144, 145, 146, 147, 148, 149, 273, 366/274, 138; 99/348; 62/342, 324, 325, 62/352
See application file for complete search history.

(56) References Cited

U.S. PATENT DOCUMENTS

| | | | | | |
|---|---|---|---|---|---|
| 1,954,518 | A | * | 4/1934 | Downer | ......................... 62/392 |
| 2,080,639 | A | * | 5/1937 | Taylor | ............................ 62/105 |
| 2,251,736 | A | * | 8/1941 | Aller | ............................... 62/225 |
| 2,752,763 | A | * | 7/1956 | Shepard | ........................... 62/59 |

(Continued)

FOREIGN PATENT DOCUMENTS

| | | |
|---|---|---|
| CN | 1468356 | 1/2004 |
| EP | 0088351 | 9/1983 |

(Continued)

OTHER PUBLICATIONS

Office Action dated Apr. 8, 2014 issued by the State Intellectual Property Office of the Peoples' Republic of China for related Chinese Application No. 201110355049.5 with attached English translation, 14 pages.

(Continued)

*Primary Examiner* — Tony G Soohoo
(74) *Attorney, Agent, or Firm* — Timothy J. Klima; Shuttleworth & Ingersoll, PLC

(57) ABSTRACT

A machine for the homogenization and thermal treatment of liquid and semi-liquid food products, for example ice creams, whipped cream, creams, chocolate, yogurt and the like, comprises a containment tank for the mixture and a centrifugal pump put in fluid communication with the bottom of the containment tank for drawing mixture from the tank and putting it back into the tank, heating and cooling means acting at the pump for heating and cooling the mixture in transit in the pump. The heating and cooling means comprise a thermal machine with reversible thermodynamic cycle and using carbon dioxide as refrigerant.

12 Claims, 3 Drawing Sheets

(56) References Cited

U.S. PATENT DOCUMENTS

| | | | | |
|---|---|---|---|---|
| 3,044,277 | A | * | 7/1962 | Barnum .................... 62/342 |
| 3,069,866 | A | * | 12/1962 | Dunn ...................... 62/136 |
| 3,319,436 | A | * | 5/1967 | Wilch ..................... 62/68 |
| 3,359,748 | A | * | 12/1967 | Booth ..................... 62/136 |
| 3,378,170 | A | * | 4/1968 | Reynolds et al. .......... 222/129.4 |
| 3,400,551 | A | * | 9/1968 | Booth et al. .............. 62/135 |
| 3,620,040 | A | * | 11/1971 | Clearman et al. .......... 62/354 |
| 3,733,840 | A | * | 5/1973 | Pearl et al. ............... 62/78 |
| 3,788,090 | A | * | 1/1974 | Richards .................. 62/139 |
| 4,058,383 | A | * | 11/1977 | Peterson .................. 62/85 |
| 4,083,200 | A | * | 4/1978 | Luxem .................... 62/342 |
| 4,607,494 | A | | 8/1986 | Cipelletti |
| 4,860,550 | A | | 8/1989 | Aoki et al. |
| 5,758,571 | A | * | 6/1998 | Kateman et al. ........... 99/455 |
| 6,210,033 | B1 | * | 4/2001 | Karkos et al. ............. 366/274 |
| 6,460,368 | B1 | * | 10/2002 | Grande Damaso ......... 62/342 |
| 6,467,944 | B2 | * | 10/2002 | Ugolini ................... 366/144 |
| 7,185,506 | B2 | | 3/2007 | Aflekt et al. |
| 7,530,235 | B2 | * | 5/2009 | Yamaguchi et al. ........ 62/467 |
| 2002/0196705 | A1 | * | 12/2002 | Jersey et al. .............. 366/274 |
| 2005/0178129 | A1 | * | 8/2005 | Rudick et al. ............. 62/113 |
| 2008/0173672 | A1 | * | 7/2008 | Martin .................... 222/129.1 |
| 2009/0000312 | A1 | * | 1/2009 | Smith et al. .............. 62/6 |
| 2009/0277198 | A1 | * | 11/2009 | Yamaguchi et al. ........ 62/118 |
| 2010/0104729 | A1 | * | 4/2010 | Paxman et al. ............ 426/590 |
| 2010/0281909 | A1 | * | 11/2010 | Carpanzano .............. 62/386 |
| 2011/0225981 | A1 | * | 9/2011 | Glaros et al. ............. 62/3.6 |
| 2012/0294111 | A1 | * | 11/2012 | Rosengren et al. ......... 366/274 |
| 2013/0269381 | A1 | * | 10/2013 | Cocchi et al. ............. 62/246 |

FOREIGN PATENT DOCUMENTS

| | | |
|---|---|---|
| EP | 1734320 | 12/2006 |
| GB | 2031292 | 4/1980 |

OTHER PUBLICATIONS

Search Report dated Jul. 22, 2011 from counterpart foreign application, Italy, application ITBO 20100647, 7 pages.

* cited by examiner

MACHINE FOR THE HOMOGENIZATION AND THERMAL TREATMENT OF LIQUID AND SEMI-LIQUID FOOD PRODUCTS

This application claims priority to Italian Patent Application BO2010A000647 filed Oct. 28, 2010, the entirety of which is incorporated by reference herein.

BACKGROUND OF THE INVENTION

This invention relates to a machine for the homogenization and thermal treatment of liquid and semi-liquid food products such as, for example ice creams, whipped cream, creams, chocolate, yogurt and the like.

It should be noted that machines for the homogenization and thermal treatment of liquid and semi-liquid food products such as, for example ice creams, whipped cream, creams, chocolate, yogurt and the like are machines which perform operations such as heating (intended, for example, to facilitate mixing of the ingredients of the mixture), pasteurization (in the typical sense of thermal treatment), homogenization (that is to say, preventing and/or delaying the natural tendency of the substances in the mixture to separate), aging (that is to say, allowing the product to rest at a suitable temperature) and storage (that is, keeping the product at a low temperature until used).

Known in the prior art are many machines for the homogenization and thermal treatment of liquid and semi-liquid food products such as ice creams, whipped cream, creams, chocolate, yogurt and the like, comprising a containment tank having on the bottom of it a vessel pump for circulating the mixture and equipped with an electrical heater and a cooling circuit.

In machines of this kind, the vessel pump causes the mixture to circulate inside the tank and at the same time also heats and then cools the mixture itself.

More specifically, when the pump blade comes into operation, the mixture in the tank is drawn into the pump vessel and then returned to the tank, thereby stirring and blending the mixture.

When the electrical heater is activated, the mixture circulating through the pump is subjected to heating characterized by high heat exchange coefficients. Generally speaking, when the mixture reaches the desired temperature (whether for low, medium or high pasteurization), the heater is switched off and the cooling circuit switched on until the mixture reaches a steady state at the aging or storage temperature (a low temperature around 2° to 6° C.).

The electric heater usually consists of an electrical heating element mounted in the wall of the pump and/or of the tank and heated by the Joule effect.

The cooling circuit, on the other hand, consists of the evaporator of a cooling system coiled around the pump liner and/or the side wall of the tank.

The prior art machines described briefly above have several disadvantages.

Mounting the electric heater on the bottom of the vessel pump or on the side wall of the tank does not guarantee optimum transmission of heat to the mixture circulating in the pump. Heating the mixture may therefore take a very long time since the operating temperature of the heating element cannot be raised too much (without the risk of locally overheating the mixture).

It is also extremely difficult to control the local temperature of the heating elements and to prevent the formation of hot spots (leading to local overheating and burning of the mixture).

Further, it has proved extremely complex to mount the electric heating element in the same way as the evaporator of the cooling circuit because the surface available for heat exchange is not large enough for both.

Further, since a complete thermal treatment cycle comprises heating, holding the temperature, cooling and again holding the temperature, it is necessary to strike a compromise which optimizes both steps of heating and cooling.

Moreover, again in connection with this aspect, in the transient from heating and/or holding the temperature to cooling, the process is significantly slowed by the thermal inertia of the heating elements and of the mass of mixture, delaying the treatment of the food mixture.

Lastly, the above machines consume large amounts of electricity, thus increasing machine running costs considerably.

SUMMARY OF THE INVENTION

In this context, the technical purpose which forms the basis of this invention is to propose a homogenization, thermal treatment and pasteurization machine which overcomes the above mentioned disadvantages of the prior art.

More specifically, this invention has for an aim to provide a pasteurization machine capable of heating the mixture uniformly and effectively.

Another aim of the invention is to provide a homogenization, thermal treatment and pasteurization machine having limited running costs.

The technical purpose indicated and the aims specified are substantially achieved by a machine comprising the technical features described in one or more of the accompanying claims.

BRIEF DESCRIPTION OF THE DRAWINGS

Further features and advantages of the invention are more apparent in the detailed description below, with reference to a preferred, non-limiting embodiment of a machine for the homogenization and thermal treatment of liquid and semi-liquid food products, illustrated in the accompanying drawings, in which.

DESCRIPTION OF THE PREFERRED EMBODIMENTS

Figure 1:
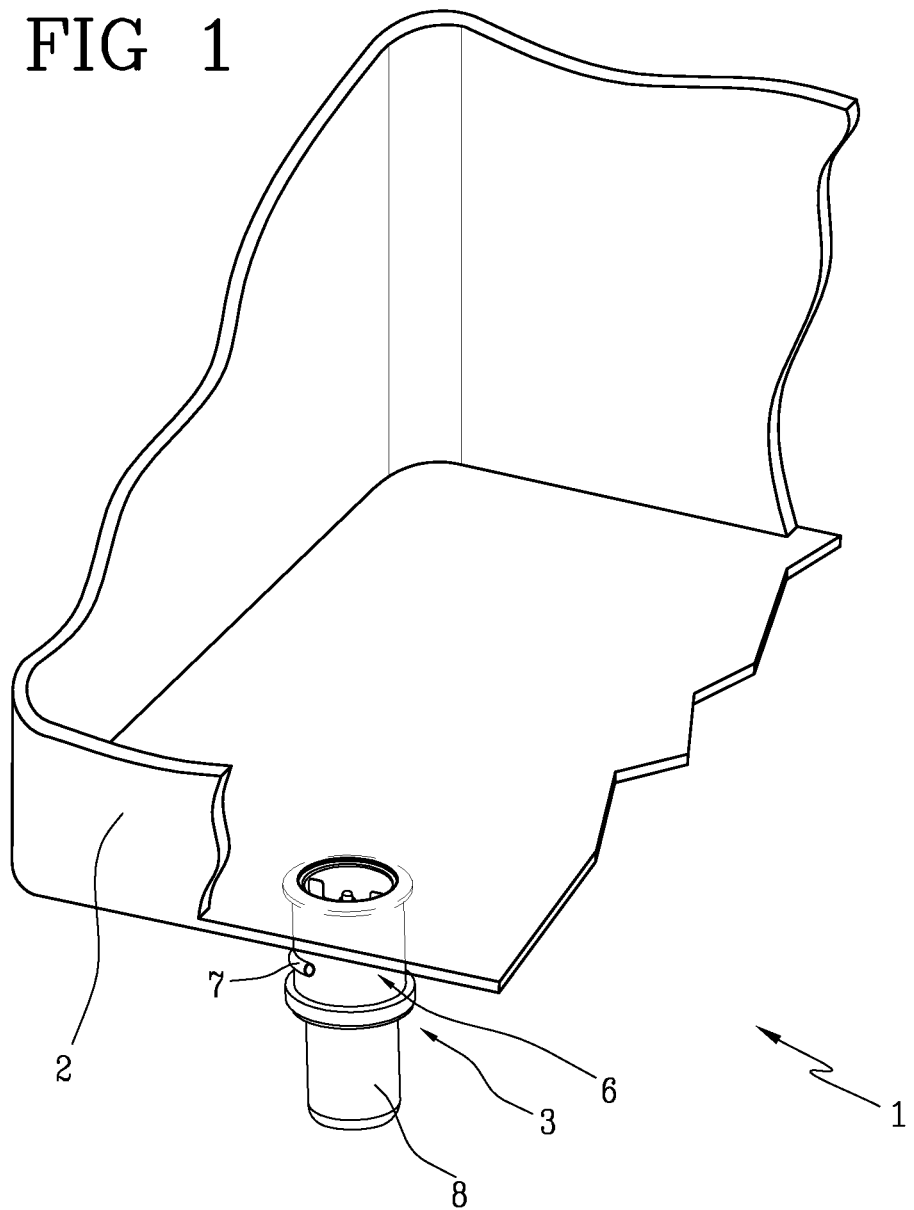
FIG. 1 is a schematic representation of a machine according to this invention for the homogenization and thermal treatment of liquid and semi-liquid food products.

With reference to the accompanying drawings, the numeral 1 denotes in its entirety a machine for the homogenization and thermal treatment of liquid and semi-liquid food products such as, for example ice creams, whipped cream, creams, chocolate, yogurt and the like.

The machine 1 comprises a containment tank 2 for the mixture and a centrifugal pump 3 put in fluid communication with the bottom of the containment tank 2 for drawing mixture from the tank and putting it back into the tank.

Heating and cooling means 4 operate at the pump 3 for heating and cooling the mixture in transit in the pump 3.

Advantageously, the heating and cooling means 4 comprise a thermal machine with reversible thermodynamic cycle.

The thermal machine with reversible thermodynamic cycle operates according to a transcritical thermodynamic cycle and uses carbon dioxide ($CO_2$) as refrigerant.

In other words, the thermal machine with reversible thermodynamic cycle can operate either as a heat pump or as a cooling machine depending on the direction of the transcritical thermodynamic cycle.

The basic difference between carbon dioxide and traditional refrigerants such as, for example, HFC (R-134a and R-404A) and hydrocarbons is the critical temperature value which, for carbon dioxide, is 31° C.

Thus, in a traditional vapor compression cycle, the transfer of heat to the surrounding environment (that is to say, to the food mixture when the machine operates as a heat pump) does not entail condensation of carbon dioxide but its gradual cooling until obtaining a dense gas phase.

A thermal machine with reversible thermodynamic carbon dioxide cycle does not therefore contemplate a condenser but a dense gas refrigerator, known as gas-cooler.

The corresponding thermodynamic cycle is referred to as transcritical because it occurs between two isobars, the first of which (at the inlet to the compressor and hence at the outlet from the evaporator) at a pressure lower than the critical value, and the other at a pressure higher than the critical value (at the outlet from the compressor and into the gas-cooler).

Advantageously, the thermal machine comprises a pipe 5 coiled around a containment body 6 holding the centrifugal pump 3.

The pipe 5 operates as an evaporator when the cooling means are activated and as a gas-cooler when the heating means are activated.

The carbon dioxide in the pipe 5 flows in countercurrent with respect to the flow of the mixture in the pump 3.

In other words, the pipe 5 heats the mixture flowing through the pump 3 when the thermal machine is working as a heat pump, and the selfsame pipe 5 cools the mixture flowing through the pump 3 when the thermal machine is working with a thermodynamic cycle which is the reverse of that of the heat pump (that is to say, when it is working as a cooling machine).

In an alternative embodiment (not illustrated) the pipe 5 is substituted with a direct exchange evaporator integral with the containment body 6 of the centrifugal pump 3.

This evaporator works by direct expansion when the cooling means are activated and as a gas-cooler when the heating means are activated.

In other words, the purpose of the evaporator is exactly the same as that of the pipe 5 and thus, all the functions performed by the pipe 5 are performed by the evaporator.

When the thermal machine 4 operates as a cooling machine, work is supplied to extract heat from the mixture and transfer it, increased by the thermal equivalent of the work done, to the outside environment.

Basically, a superheated vapor compression machine consists of a compressor, an evaporator, a condenser (or gas-cooler in the case of $CO_2$) and an expansion element (consisting, for example, of a capillary tube or a thermostatic valve). During the operating cycle, the refrigerant, for example carbon dioxide, is compressed and brought to gas-cooler inlet pressure.

The refrigerant in the gas-cooler cools down at a constant pressure until reaching a dense gas phase transferring heat to the surrounding environment.

It should be noted that at this stage the carbon dioxide does not undergo any phase change.

In other words, the refrigerant does not condense but undergoes dense gas cooling.

Next, by a lamination effect, the carbon dioxide undergoes adiabatic expansion from the second pressure to the first.

The refrigerant then enters the evaporator (consisting of the pipe 5), absorbing heat from the mixture in transit through the pump 3, thus completing the thermodynamic cycle with a step of isobaric heating.

When the thermal machine operates as a heat pump, that is to say, when the mixture in transit through the pump has to be heated, the thermodynamic cycle described above is performed in reverse.

That way, the transfer of heat to the mixture in transit through the centrifugal pump 3 occurs in the pipe 5 acting as a gas-cooler.

It should also be noted that the heat pump provides more thermal energy (that is, heat transferred to the mixture to be heated) than the electrical energy used by the compressor since it absorbs heat from the outside environment.

That way, the mixture in transit through the pump is heated in a much more energy efficient manner than if it were heated using Joule effect electrical heating elements (in which the thermal energy transferred is less than the electrical energy used).

It should also be noted that the substantial amount of energy (that is to say, the maximum mechanical work that can be extracted from the system when it is brought to a state of equilibrium with a reference environment) made available when the hot gas is cooled in the gas-cooler is partly recovered by the heated food mixture, allowing the machine 4 to obtain an efficiency level comparable with or greater than machines of the same kind operating with traditional refrigerants such as, for example, R-134a and R-404A.

The shape of the hypercritical isobars for carbon dioxide show that transcritical cycles operating with this refrigerant are optimal for heat pumps used for heating a flow of fluid with large fluid temperature variations.

Figure 3:
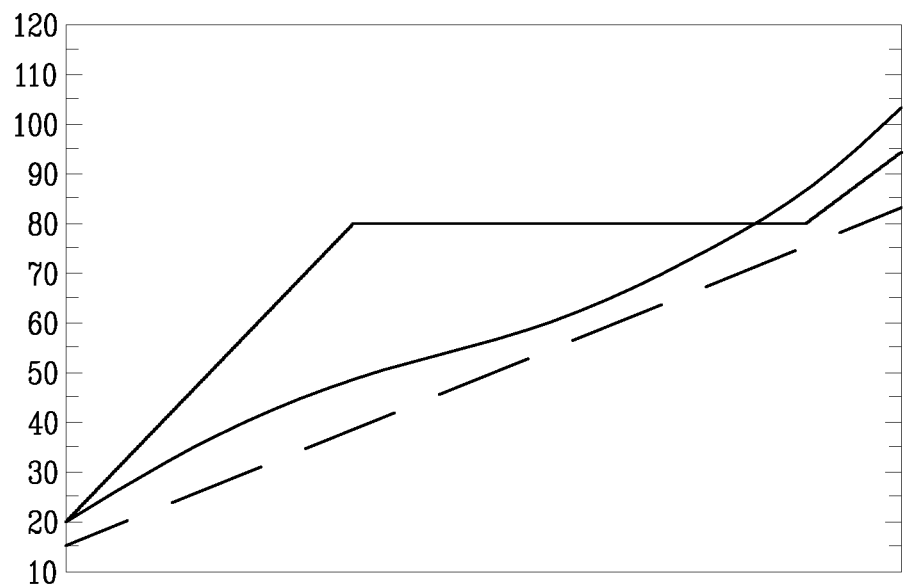
FIG. 3 shows a graph representing an operating parameter of the machine of FIG. 1.

The above may be inferred from FIG. 3 which shows the temperature profiles of carbon dioxide at a pressure of 120 bar (unbroken line) and a water flow heated in countercurrent (dashed line) in the gas-cooler from 15° to 84° C. (the temperature values are shown on the y-axis).

As may be noticed from the graph, the two curves are very well matched, demonstrating the better efficiency in heating the liquid mixture compared to a machine which uses a traditional refrigerant.

In effect, the same graph also shows the temperature profile (decidedly less favorable) in the condenser of a heat pump which uses R-134a for the same process (dotted line).

Structurally, the pump 3 is directly connected to the bottom of the tank 2 (see FIG. 1) and comprises an intake opening (not illustrated) located at the top of the pump 3 and at least one delivery opening 7 located in a lower portion of the pump 3.

The delivery opening 7 makes the heated or cooled mixture circulate in the tank 2.

The heat pump is controlled automatically by selecting the thermal cycle—for example, type of pasteurization required (high, low or medium)—in such a way that the thermodynamic cycle for heating the mixture is set at the correct temperature for the necessary length of time (depending also on the quantity of mixture to be treated).

When pasteurization is over, the heat pump, for example, starts the thermodynamic cycle by which the pasteurized mixture is cooled for homogenization and/or aging and/or storage purposes.

Preferably, the centrifugal pump 3 is magnetically driven.

In this regard, the pump 3 comprises an electrical motor 8, preferably brushless, connected to a driving shaft 9.

Figure 2:
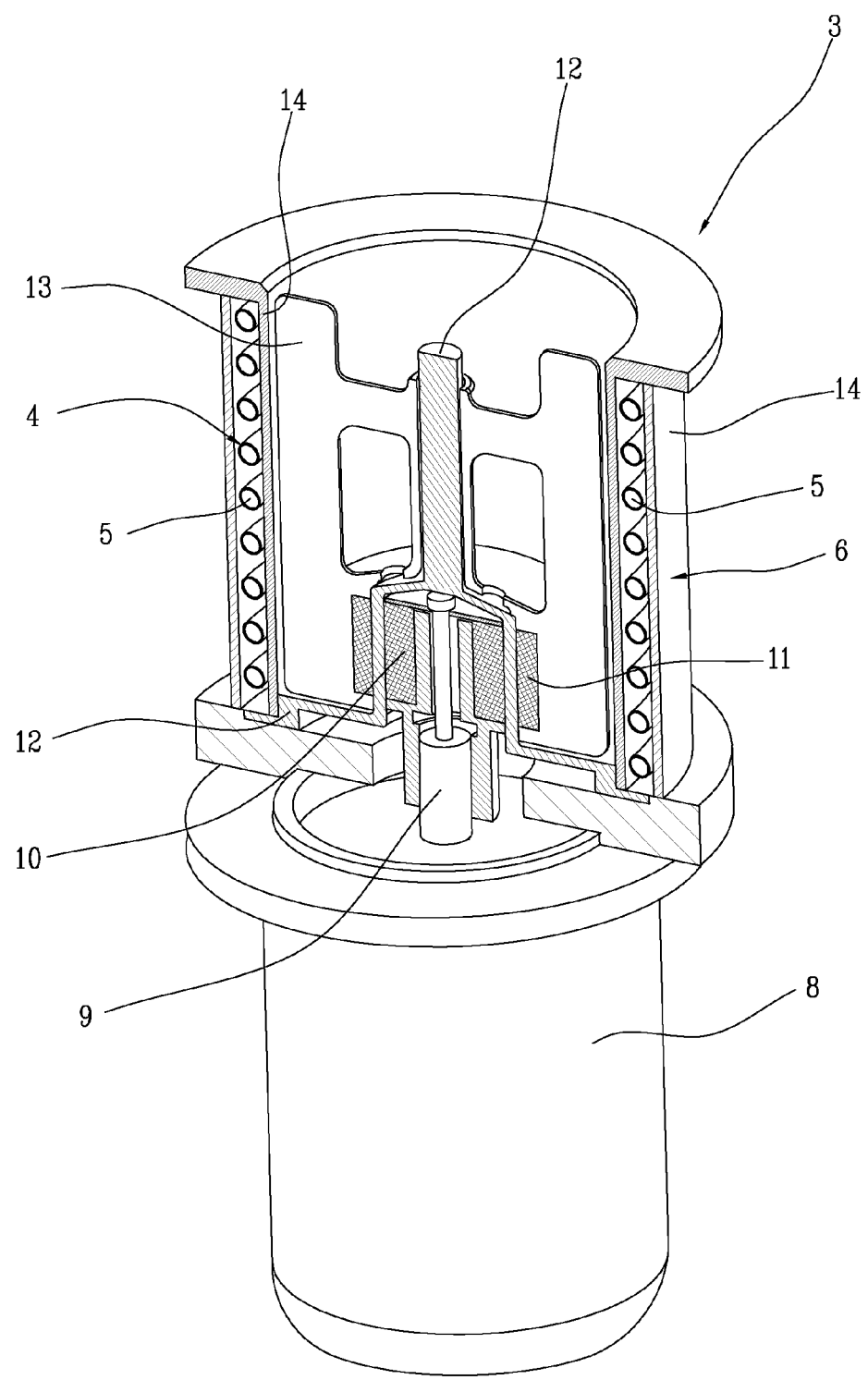
FIG. 2 is a perspective view, with some parts cut away in order to better illustrate others, of a detail from FIG. 1.

The electric motor 8 is mounted under, and associated with, the containment body 6 of the pump 3, as illustrated in FIG. 2.

The driving shaft 9 protrudes from the electric motor 8 and enters the containment body 6 of the pump 3.

The driving shaft 9 has associated with it a driving magnet 10 which, preferably, radially surrounds the driving shaft 9.

The driving magnet 10 is rotatably driven by the driving shaft 9.

A driven magnet 11 is operatively associated with the driving magnet 10 in such a way that the rotation of the driving magnet 10 causes the driven magnet 11 to rotate.

In the preferred embodiment of the invention, the driven magnet 11 radially surrounds the driving magnet 10.

It should be noted that the driving magnet 10 and the driven magnet 11 are physically separated, and more specifically, divided, by a fixed element 12.

The fixed element is integral with the containment body 6 of the pump 3 and extends from a lower portion of the pump 3—that is to say, a portion facing the electric motor 8—to an upper portion of the pump 3 (FIG. 2).

Preferably, the driving magnet 10 lies in a housing which is defined by the fixed element 12 and which is hermetically separated from the zone of the pump 3 through which the mixture passes.

Further, the fixed element 12 has fitted to it an impeller 13 which rotates about the fixed element 12 to generate a pressure head.

The impeller 13 is integral with the driven magnet 11 in such a way as to be rotationally driven by the rotation of the driven magnet 11.

The containment body 6 of the centrifugal pump 3 comprises two annular walls 14 made of a material with high thermal conductivity, such as aluminum.

The pipe 5 is placed in the gap between the two annular walls.

Figure 4:
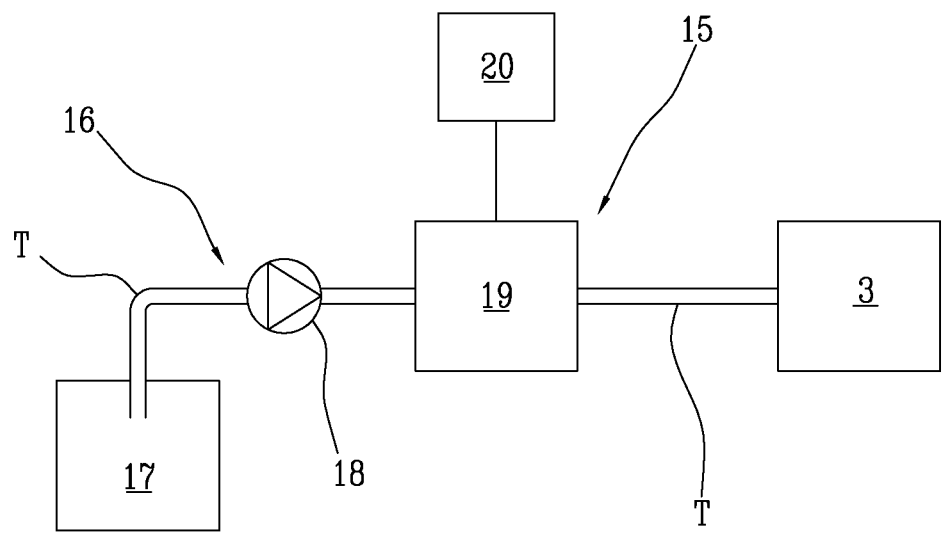
FIG. 4 schematically represents a detail of the machine of FIG. 1.

To guarantee the correct operation of the machine 1, the latter comprises a device 15 for washing the centrifugal pump 3 and the containment tank 2 (FIG. 4).

The washing device 15 comprises a connection 16 to a source 17 of washing liquid.

The connection 16 comprises a conduit T and a pump 18 for drawing the washing liquid from the source 17.

The source 17 is a tank containing water and/or a sanitizing liquid or, alternatively, it may be the water mains.

The washing device 15 also comprises a heater 19, for example a boiler, for the washing liquid, for producing superheated steam.

The heater is connected to the conduit T which extends as far as the pump 3 (passing through the boiler), forming a circuit for channeling the liquid and/or the superheated steam into the centrifugal pump 3.

The washing device 15 is equipped with control means 20 comprising a central processing unit which in turn comprises timing means and means for regulating the temperature of the heater 19.

In use, when the machine 1 does not have any food mixture in it, a first step is activated which comprises heating the washing liquid while keeping it in the liquid state and then conveying it into the pump 3 through the conduit T. During this step, the pump 3 is on and makes the washing liquid circulate both in the pump and in the tank 2. At the end of this step, the pump 3 is switched off and hot washing liquid is fed into the pump itself.

At the end of the second step in the cycle, the heater 19 heats the washing liquid to produce superheated steam which is fed through the conduit T into the centrifugal pump 3 (which, during this step, is off). That way, the machine 1 is fully and thoroughly sanitized.

The steps described above can be repeated as required.

The invention can be modified and adapted in several ways without thereby departing from the scope of the inventive concept.

What is claimed is:

1. A machine for homogenization and thermal treatment of at least one chosen from a liquid food product and a semi-liquid food product, comprising
   a containment tank for a mixture of the at least one chosen from the liquid food product and the semi-liquid food product,
   a centrifugal pump for pumping the mixture, the centrifugal pump having an intake opening in fluid communication with a bottom of the containment tank for drawing mixture from the tank and a delivery opening in fluid communication with the tank for returning the pumped mixture back into the tank, and
   a heating and cooling mechanism acting at the centrifugal pump for selectively heating and cooling the mixture in transit in the centrifugal pump,
   the heating and cooling mechanism comprising a thermal machine with a reversible transcritical thermodynamic cycle, using carbon dioxide as a refrigerant, for selectively heating and cooling the mixture.

2. The machine according to claim 1, wherein the thermal machine comprises a pipe wound around a containment body of the centrifugal pump; the pipe operating as an evaporator when the heating and cooling mechanism is operated as a cooling mechanism and operating as a gas-cooler when the heating and cooling mechanism is operated as a heating mechanism.

3. The machine according to claim 2, wherein an operating fluid passing through the pipe operates with a countercurrent flow relative to the mixture passing through the centrifugal pump.

4. The machine according to claim 1, wherein the thermal machine operates as an evaporator when the heating and cooling mechanism is operated as a cooling mechanism and operates as a gas-cooler when the heating and cooling mechanism is operated as a heating mechanism.

5. The machine according to claim 1, wherein the centrifugal pump is directly connected to the bottom of the tank, the intake opening is located at a top of the centrifugal pump and the delivery opening is located in a lower portion of the centrifugal pump.

6. The machine according to claim 1, wherein the centrifugal pump is a magnetic drive centrifugal pump.

7. The machine according to claim 5, wherein the centrifugal pump comprises:
   an electric motor connected to a driving shaft;
   a driving magnet which is rotatably driven by the driving shaft;
   a driven magnet being operatively associated with the driving magnet and rotatably driven by the driving magnet, and;
   an impeller rotatably driven by the driven magnet.

8. The machine according to claim 7, wherein the centrifugal pump comprises a fixed unit integral with a containment body of the centrifugal pump on which the impeller is rotatably fitted; the fixed unit physically separating the driven magnet from the driving magnet.

9. The machine according to claim 8, wherein the washing device comprises:
   a connection to a source of washing liquid,
   a heater device for the washing liquid, for producing superheated steam, and
   a circuit for conveying at least one chosen from the washing liquid and the superheated steam inside at least one chosen from the centrifugal pump and the containment tank.

10. The machine according to claim 1, and further comprising a washing device for washing the centrifugal pump and the containment tank.

11. The machine according to claim 1, wherein the at least one chosen from a liquid food product and a semi-liquid food product includes at least one chosen from ice cream, whipped cream, cream, chocolate, and yogurt.

12. A machine for homogenization and thermal treatment of at least one chosen from a liquid food product and a semi-liquid food product, comprising
   a containment tank for a mixture of the at least one chosen from the liquid food product and the semi-liquid food product,
   a centrifugal pump for pumping the mixture, the centrifugal pump having an intake opening in fluid communication with a bottom of the containment tank for drawing mixture from the tank and a delivery opening in fluid communication with the tank for returning the pumped mixture back into the tank, wherein the intake opening is located in a top portion of the centrifugal pump and the delivery opening is located in a lower portion of the pump, and
   a heating and cooling mechanism acting at the centrifugal pump for heating and cooling the mixture in transit in the centrifugal pump,
   the heating and cooling mechanism comprising a thermal machine with a reversible transcritical thermodynamic cycle, using carbon dioxide as a refrigerant, for selectively heating and cooling the mixture.

* * * * *